Patented Apr. 17, 1945

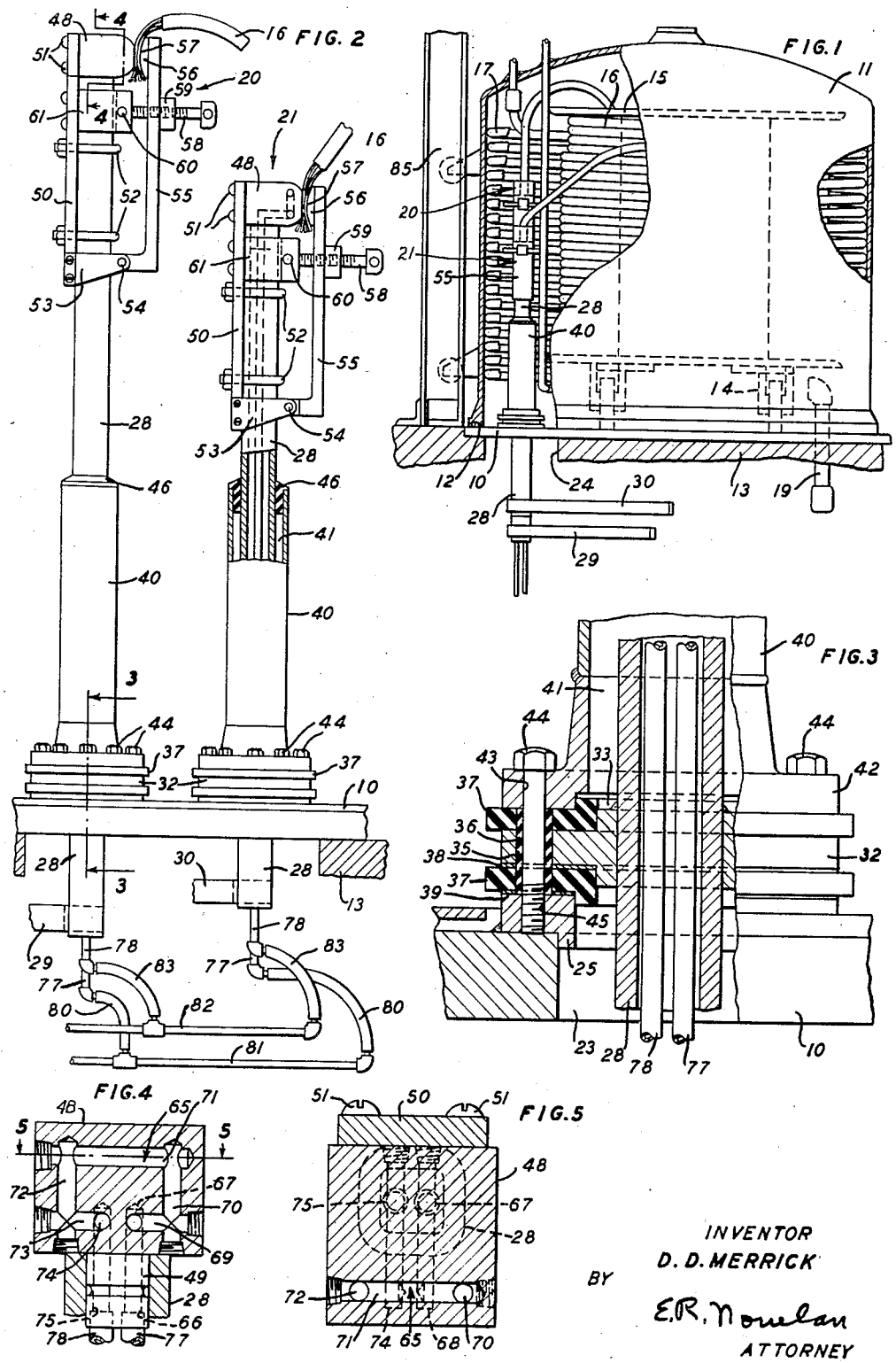

2,373,841

UNITED STATES PATENT OFFICE 2,373,841

ELECTRICAL CONNECTOR

De Witt D. Merrick, Cranford, N. J., assignor to Western Electric Company, Incorporated, New York, N. Y., a corporation of New York Application August 14, 1941, Serial No. 406,805

3 Claims. (Cl. 34—1)

This invention relates to electrical connectors, and more particularly to electrical terminal structures for use in drying telephone cable within vacuum enclosures.

During the manufacture of electrical cables, such as those used in the communication arts, the insulated coverings of textile, paper or the like receive quantities of moisture from the atmosphere which must be removed to eliminate possible short circuits when the cable is in use. To remove moisture from the cable, the cable is, for example, wound on a reel and thus disposed in a vacuum enclosure. The vacuum with the aid of heat externally of the cable in the enclosure may be sufficient to remove the moisture from the cable and then from the enclosure but the time required for this process is quite long. The time required for the process is shortened if the moisture is first driven from the cable. This is accomplished by passing an electrical energy of sufficiently high amperage to vaporize the moisture; thus the need of electrical terminals each of suitable structure to include an end of the cable in an electrical circuit and to withstand the heat of the electrical energy passing therethrough.

An object of the invention is to provide a simple, efficient and highly practical electrical terminal of the fluid-cooled type.

With this and other objects in view, the invention comprises an electrical terminal for use in an enclosure having an apertured wall, the terminal including a hollow body with a head portion for electrical connection with an article to be treated, the body also having a flange secured thereto at the aperture in the wall and cooperating with securing means to secure the body in the aperture to insulate the body from the wall and to form an air-tight seal.

Other objects and advantages will be apparent from the following detailed description when taken in conjunction with the accompanying drawing, wherein Fig. 1 is a side elevational view of an enclosure, portions thereof being broken away to illustrate the terminals therein;

Fig. 2 is an enlarged side elevational view of the terminals illustrated in Fig. 1;

Fig. 3 is an enlarged fragmentary detailed view taken along the line 3—3 of Fig. 2;

Fig. 4 is an enlarged fragmentary sectional view taken substantially along the line 4—4 of Fig. 2, and Fig. 5 is a sectional view taken along the line 5—5 of Fig. 4.

Attention is now directed to the drawing, particularly Fig. 1, wherein there is illustrated a wall 10, which in this general structure may be termed a base or supporting plate, for enclosure or container 11. In this illustration the container 11 is in the form of a hood-like oven formed to rest upon the wall 10 and be sealed at the meeting edge with the wall by a sealing strip 12 embedded in the lower edge thereof. If desired, the invention may be combined with any desired container, and for the purpose of the description of the invention in the claims, the element 10, serving as a base and a separable portion of the container 11, may be an integral wall of the enclosure or container.

The wall 10 is embedded in a floor 13 so that the upper surface of the wall will be at floor level for the rolling of a truck 14 onto the wall. The truck 14 is of a suitable structure to support a reel 15 upon which an article, such as cable 16, is disposed. In the container 11 suitable heating means, such as a coil 17 through which steam may be circulated, is disposed adjacent the inner wall, but this feature is not of great importance regarding the invention, this heating means serving as an auxiliary means to assist in elevating the temperature within the container to a given degree and maintaining this temperature during the treating of the article, namely the cable. The heating means 17 will heat the cable externally but it is necessary that internal heat be applied within the cable to vaporize the moisture in the insulated coverings thereof and to drive this moisture out of the cable and into the container. When this has been accomplished a vacuum created in the container, through the aid of a vacuum line 19, may cause removal of the moisture from the container.

The means to cause internal heating of the cable includes terminals indicated generally at 20 and 21. These terminals are identical in structure with the exception of their variation in height or length. For each terminal 20 and 21 there is provided an aperture 23 in the wall 10, and a larger aperture 24 formed in the floor 13 and communicating with both apertures 23 in the wall. Adjacent each aperture 23 an annular member 25 is disposed, this member being rigidly secured to the inner surface of the wall by suitable means such as welding.

The terminals each have a tubular body 28 of suitable lengths, these lengths varying for the different terminals, the variation in the lengths of the bodies compensating for the positioning of the upper ends thereof for receiving the ends of the cable, as will hereinafter be described, and the positioning of the lower ends thereof for electrical connection with their respective bus bars 29 and 30. A flange 32, annular in general contour and having an enlarged or thicker central portion 33 (Fig. 3) apertured to centrally receive the body 28, is provided for each body and is secured in place by suitable means such as brazing. The flanges 32 of the terminals are formed of the same material that the bodies 28 are formed of, this being a conductive material such as brass. Adjacent the outer edges of the flanges 32, apertures 35 are formed at spaced positions to receive insulating bushings 36. Insulating washers 37 are disposed upon each side of the flanges 32 and are of the general contour illustrated in Fig. 3, these washers also being apertured at spaced positions adjacent their peripheries to receive the insulating bushings 36. Suitable shims 38 and 39 are disposed upon opposite sides of the lower insulating washers 37, and/or the upper washers if so desired, to bring about adjustment of the relative parts securing the bodies 28, through their flanges 32, to the wall 10. A casing 40 for each body 28 is of sufficient size to provide an air space 41 between the inner walls of the casing and the outer walls of the body in each terminal. The lower ends of the casings 40 are flared outwardly, as at 42, providing integral flanges, apertured at 43, at spaced positions about the periphery thereof to receive securing screws 44, the latter extending through the apertures 43, the insulating bushings 36 aligned therewith, and into aligned threaded apertures 45 in the annular member 25, to thus secure the bodies 28 through their flanges 32 within the apertures 23 of the wall 10, forming an airtight seal through the association of the insulating washers 37 and the bushings 36 in addition to the flange 32 of the casing 40, the washers 37 and the bushings 36 also serving to insulate the bodies from the wall. The upper ends of the casings 40 are closed about their respective bodies 28 by annular plugs 46 of suitable insulating material.

At the upper end of each body 28, a head portion 48 is disposed. The head portions are also identical in structure, having integral cylindrical projections 49 (Fig. 4) receivable in the upper ends of their respective bodies and secured in place in any suitable manner, providing a rigid and air-tight connection. One securing means illustrated in the drawing includes a plate 50 for each head portion secured to an adjacent flat wall of the head by means of screws 51 and provided with U-bolts 52 to rigidly secure the plate in each terminal to its respective body 28. The lower end of the plate 50 in each terminal is provided with arms 53 upon opposite sides of their respective bodies, providing pivotal supports 54 for clamps 55. Clamps 55 each have engaging portions 56 cooperating with engaging surfaces 57 of their respective head portions to clamp selected ends of the cable 16 therebetween. The clamps 55 are actuated through the aid of screws 58, having their threaded portions passing through nut-like members 59 integral with the clamps 55, their inner ends being pivotally held, at 60, in brackets 61 mounted upon the plates 50.

Attention is now directed to the fluid passageways in the head portions. The passageways in the heads are indicated generally at 65 entering each head at 66 (Fig. 4). From the entrance end 66 the passageway extends upwardly to a point indicated at 67, then forwardly (Figs. 2 and 5) to a point indicated at 68, where the passageway turns to the right, as at 69 (Fig. 4), then upwardly at 70, to the left at 71, downwardly at 72, to the right at 73, then rearwardly at 74, to a point where it meets with its outlet end 75. The path of the passageway in each head thus travels forwardly to a point adjacent the surface 57 and travels through an almost complete circuitous path adjacent the surface 57 and eventually travels back to the outlet end. A supply line 77, passing through each body, is connected to the entering end 66 of the passageway 65, while a return line 78, also passing through each body, is connected to the exit end 75. The lines 77 of the terminals are connected by flexible tubes 80 to a main cooling fluid supply line 81, while the lines 78 are connected to a main return line 82 by flexible tubes 83. The flexible tubes 80 and 83 are formed of a suitable insulating material to avoid short circuiting between the terminals.

During the operation of the structure illustrating the invention, an article to be treated is disposed in the casing. In the present instance the article is an electrical cable and the casing is formed in two parts, the hood being movable away from the wall 10, by suitable means (not shown), aided by suitable guide means 85 so as to permit rolling of the truck 14 onto the wall. The ends of the cable are then secured to the terminals through the operation of the clamps 55, connecting the ends of the cable to the surfaces 57 of the head portions 48. The container or enclosure 11 may then be lowered and come to rest upon the wall 10, forming an air-tight seal therebetween. The heating means 17 may be rendered effective, or if desired may be maintained effective at all times.

The electrical energy of sufficiently high amperage may then be passed through the terminals and the cable by suitable electrical connection with the bus bars 29 and 30, to complete a circuit including the terminals and the cable. During this time the cooling fluid is circulated through the lines 77 which are housed in their respective bodies 28, serving to cool the bodies, the cooling fluid continuing through the paths provided by the passageways 65 to direct the cooling fluid through an extensive area near the surfaces 57, the cooling fluid returning through the lines 78 to their connections 82 and 83. During this process the cable will be heated by the electrical energy, vaporizing the moisture in the insulating coverings of the cable, effecting driving of the moisture from the cable and into the container. The vacuum line 19 then functions to remove the vaporized moisture from the container, leaving the cable free of moisture.

An important feature of this invention consists of the cooling means housed in the hollow bodies of the terminals including the contour of the passageways in the head portions. The cooling of the head portion at the contact surface 57 eliminates excessive heating of the head portion and the portions of the cable at and near the head portion due to contact resistance created at the connection of the cable with the terminal. Another feature also includes the bodies, their tubular contours, together with their annular flanges formed of the same conductive material, and cooperating with the other elements to secure the bodies in the apertures of the wall, forming an air-tight connection, a rigid support for the bodies and one wherein the bodies are insulated from the wall. The forming of the flanges 32 of the same material as the bodies eliminates the possibility of breakage under the intense heat or variations in expansion and contraction, which might result in damage at the connection, resulting also in the elimination of a solid support for the body and the maintaining of an air-tight connection between the body and the wall.

The embodiment of the invention herein disclosed is merely illustrative and may be widely modified and departed from in many ways without departing from the spirit and scope of the invention as pointed out in and limited solely by the appended claims.

What is claimed is:

1. An electrical connector comprising a tubular body of conductive material, a terminal head having a conductor engaging surface lying in a given plane and a fluid passageway through the head a portion of which extends in a circuitous path in a plane parallel with the plane of the surface, means to removably secure the terminal head on one end of the body, a member movable relative to the terminal head to hold a conductor in engagement with the said surface, means to electrically connect the body to a source of electrical energy, and means extending into the body and connected to the fluid passageway in the terminal head to circulate a cooling fluid through the passageway to cool the said surface.

2. An electrical connector comprising a tubular body of conductive material, a terminal head formed for interconnection with one end of the body having a conductor engaging surface lying in a given plane and a fluid passageway through the head a portion of which extends in a circuitous path in a plane parallel with the plane of the surface and closely adjacent the surface, means to removably secure the terminal head to the body, a member movable relative to the terminal head to hold a conductor in engagement with the said surface, means to electrically connect the body to a source of electrical energy, and means extending into the body and communicating with the fluid passageway to circulate a cooling fluid through the passageway to cool the said surface.

3. An electrical connector, in combination with an enclosure having an aperture in a wall thereof, the connector comprising a tubular body of conductive material having one end extending into the enclosure through the aperture, a terminal head removably mounted on the said end of the body in the enclosure and having a conductor engaging surface, lying in a given plane beyond the tubular body, and a fluid passageway extending into the head in alignment with the body and then at an angle with respect thereto to a position adjacent the surface, then in a circuitous path in a plane parallel with the said given plane and then extending out of the head, a member supported by the body and adapted for movement relative to the terminal head to hold a conductor in engagement with the said surface, means to electrically connect the body to a source of electrical energy, a flange formed of the same material as the body and fixed thereto adjacent the aperture, means cooperating with the flange to secure the body to the enclosure in the aperture therein and insulate the body and flange therefrom, and fluid lines extending into the body and communicating with the said fluid passageway where it extends into and out of the head to direct a cooling fluid into and away from the passageway for cooling of the said surface.

DE WITT D. MERRICK.